US012288441B2

(12) United States Patent
Fong

(10) Patent No.: US 12,288,441 B2
(45) Date of Patent: Apr. 29, 2025

(54) ELECTRONIC GAMING MACHINE AND METHOD FOR ADDING ONE OR MORE ROWS OF SYMBOL POSITIONS TO AN ARRAY OF SYMBOL POSITIONS IN AN ELECTRONIC WAGERING GAME

(71) Applicant: Aristocrat Technologies Australia Pty Limited, North Ryde (AU)

(72) Inventor: Colin Fong, Penshurst (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

(21) Appl. No.: 18/193,159

(22) Filed: Mar. 30, 2023

(65) Prior Publication Data

US 2023/0237866 A1 Jul. 27, 2023

Related U.S. Application Data

(63) Continuation of application No. 17/165,656, filed on Feb. 2, 2021, now abandoned, which is a continuation (Continued)

(30) Foreign Application Priority Data

Mar. 23, 2018 (AU) ................................ 2018202101

(51) Int. Cl.
*G07F 17/32* (2006.01)

(52) U.S. Cl.
CPC ...... *G07F 17/3213* (2013.01); *G07F 17/3244* (2013.01); *G07F 17/3262* (2013.01)

(58) Field of Classification Search
None
See application file for complete search history.

(56) References Cited

U.S. PATENT DOCUMENTS 6,155,925 A 12/2000 Giobbi
6,565,436 B1 5/2003 Baerlocher
(Continued)

FOREIGN PATENT DOCUMENTS

WO 2006037164 A1 4/2006
WO 2008148163 A1 12/2008

OTHER PUBLICATIONS

Office Action (Non-Final Rejection) dated Aug. 7, 2023 for U.S. Appl. No. 17/165,656 (pp. 1-5).
(Continued)

*Primary Examiner* — Peter J Iannuzzi
(74) *Attorney, Agent, or Firm* — Armstrong Teasdale LLP

(57) ABSTRACT

An electronic gaming machine includes a display device, a processor, and a memory storing instructions which when executed by the processor, cause the processor to control the display device to display an initial array of symbol positions, where the initial array of symbol positions include a plurality of rows of symbol positions. The instructions also cause the processor to populate each symbol position with a first plurality of symbols, and evaluate the first plurality of symbols to determine whether to provide a first game award. The instructions also cause the processor to add a new row of symbol positions to the initial array of symbol positions, and populate each symbol position of the new row of symbol positions with a second plurality of symbols.

19 Claims, 8 Drawing Sheets

Related U.S. Application Data of application No. 16/361,358, filed on Mar. 22, 2019, now Pat. No. 10,922,916.

(56) References Cited

U.S. PATENT DOCUMENTS

| | | | | |
|---|---|---|---|---|
| 9,582,960 | B2 | 2/2017 | Meyer | |
| 9,600,970 | B2 | 3/2017 | Meyer | |
| 9,805,557 | B2 | 10/2017 | Schmidt | |
| 9,824,524 | B2 | 11/2017 | Comeau | |
| 9,875,602 | B2 | 1/2018 | Prabhu | |
| 9,940,784 | B2 | 4/2018 | Schattauer | |
| 10,922,916 | B2 * | 2/2021 | Fong | G07F 17/3262 |
| 2006/0079313 | A1 | 4/2006 | Trainor | |
| 2007/0082728 | A1 | 4/2007 | Wilkins | |
| 2008/0070672 | A1 | 3/2008 | Inamura | |
| 2009/0191948 | A1 | 7/2009 | Kim | |
| 2010/0075737 | A1 * | 3/2010 | Bluemel | G07F 17/3265 463/20 |
| 2013/0102375 | A1 | 4/2013 | Aoki | |
| 2015/0348359 | A1 | 12/2015 | Comeau | |
| 2017/0092079 | A1 | 3/2017 | Marks | |
| 2017/0186267 | A1 | 6/2017 | Prabhu | |
| 2017/0193756 | A1 | 7/2017 | Schmidt | |
| 2019/0051099 | A1 * | 2/2019 | Pawloski | G07F 17/3211 |

OTHER PUBLICATIONS

Australian Examination Report No. 1 issued in App. No. AU2021273554, dated Dec. 22, 2022, 5 pages.
Notice of Allowance dated Apr. 14, 2023 for U.S. Appl. No. 17/165,656 (pp. 1-2).
Notice of Allowance dated Oct. 15, 2020 for U.S. Appl. No. 16/361,358 (pp. 1-7).
Office Action (Non-Final Rejection) dated Aug. 18, 2022 for U.S. Appl. No. 17/165,656 (pp. 1-8).
Office Action (Notice of Allowance and Fees Due (PTOL-85)) dated Jan. 5, 2023 for U.S. Appl. No. 17/165,656 (pp. 1-7).
Office Action dated May 15, 2020 for U.S. Appl. No. 16/361,358 (pp. 1-11).
Office Action (Final Rejection) dated Dec. 5, 2023 for U.S. Appl. No. 17/165,656 (pp. 1-7).

* cited by examiner

600

| | Reel position | Reel 1 (621) | Reel 2 (622) | Reel 3 (623) | Reel 4 (624) | Reel 5 (625) |
|---|---|---|---|---|---|---|
| 601 | 1 | Pic 1 | 10 | Pic 3 | Q | Pic 1 |
| 602 | 2 | Wild | Q | K | A | 10 |
| 603 | 3 | J | K | 10 | 10 | A |
| 604 | 4 | Q | A | Q | Pic 2 | Pic 2 |
| 605 | 5 | 10 | Pic 2 | K | J | A |
| 606 | 6 | A | 9 | Pic 1 | Wild (631) | Q |
| 607 | 7 | Pic 2 | Wild | J | 9 | K |
| 608 | 8 | A | Pic 3 | K | 10 | Pic 2 |
| 609 | 9 | Q | Q | 9 | A | 9 |
| 610 | 10 | K | 10 | Q | Q | Wild |
| 611 | 11 | J (641) | A | 10 | J | 9 |
| 612 | 12 | 10 (642) | Wild | Wild | K | Q |
| 613 | 13 | Pic 3 (643) | K | A | Wild | 10 |
| 614 | 14 | Wild | J | A | Pic 3 | Wild |
| 615 | 15 | 9 | 10 | Wild | Pic 1 | A |

*FIG. 6*

ELECTRONIC GAMING MACHINE AND METHOD FOR ADDING ONE OR MORE ROWS OF SYMBOL POSITIONS TO AN ARRAY OF SYMBOL POSITIONS IN AN ELECTRONIC WAGERING GAME

CROSS-REFERENCE TO RELATED APPLICATIONS

This application is a continuation of and claims priority to U.S. patent application Ser. No. 17/165,656, filed Feb. 2, 2021, which is a continuation of U.S. patent application Ser. No. 16/361,358, now U.S. Pat. No. 10,922,916, filed Mar. 22, 2019, which claims priority to Australian Patent Application No. 2018202101, filed on Mar. 23, 2018, the disclosures of which are incorporated by reference herein in their entireties.

TECHNICAL FIELD

The present disclosure relates generally to an electronic gaming machine and method, and more particularly, to an electronic gaming machine and method for adding one or more rows of symbol positions to an array of symbol positions based upon an occurrence of one or more designated symbols in the array of symbol positions.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

SUMMARY

In one aspect, an electronic gaming machine is provided. The electronic gaming machine includes a display device, a processor, and a memory storing instructions which when executed by the processor, cause the processor to control the display device to display an initial array of symbol positions, where the initial array of symbol positions include a plurality of rows of symbol positions. The instructions also cause the processor to populate each symbol position in the initial array of symbol positions with a first plurality of symbols, and evaluate the first plurality of symbols displayed in the initial array of symbol positions to determine whether to provide a first game award. The instructions also cause the processor to add, in response to the first designated symbol being populated one of the symbol positions, a new row of symbol positions to the initial array of symbol positions to create an updated array of symbol positions, and populate each symbol position of the new row of symbol positions with a second plurality of symbols.

In another aspect, a method of electronic gaming implemented on an electronic gaming machine is provided. The method includes controlling, by a processor of the electronic gaming machine, a display device of the electronic gaming machine to display an initial arrangement of symbol positions, where the initial arrangement of symbol positions includes a plurality of rows of symbol positions. The method also includes populating, by the processor, each symbol position in the initial arrangement of symbol positions with a first plurality of symbols, and evaluating, by the processor, the first plurality of symbols displayed in the initial arrangement of symbol positions to determine whether to provide a first game award. The method also includes adding, by the processor and in response to a first designated symbol being populated in the first symbol position, a new row of symbol positions to the initial arrangement of symbol positions, and populating, by the processor, each symbol position of the new row of symbol positions with a second plurality of symbols.

In yet another aspect, an electronic gaming machine is provided. The electronic gaming machine includes a display device, a processor, and a memory storing instructions which when executed by the processor, cause the processor to control the display device to simulate spinning and stopping of a plurality of reels to display a first plurality of symbols in an array of symbol positions, where the array of symbol positions includes a plurality of rows. The instructions also cause the processor to evaluate the first plurality of symbols to determine whether a first designated symbol is displayed in the array of symbol positions, and expand, in response to determining that the first designated symbol is displayed, the array of symbol positions by adding a new row of symbol positions to the array of symbol positions. The instructions also cause the processor to control the display device to simulate spinning and stopping of the plurality of reels to display a second plurality of symbols in each remaining symbol position of the expanded array of symbol positions except the symbol position of the first designated symbol.

Embodiments are also disclosed in which a gaming system or gaming device is arranged or operated so that during play (e.g., during a feature game), a series of game instances are conducted. The first game instance of the series of game instances is conducted using a first symbol array of rows and columns. A further row is added to the array in each subsequent game instance of the series. If any designated symbols (e.g., wild symbols) neighbor the added row, the designated symbol is added to the neighboring symbol position of the added row. For example, by being displayed as stretching to occupy the added row.

In an embodiment, a gaming device has a display, a processor, and a memory storing symbol data specifying a plurality of selectable symbols including a designated symbol, and instructions. When the instructions are executed by the processor, they cause the processor to control the display to display a current array of symbol positions comprising a plurality of rows, generate a first game instance by selecting first symbols from the symbol data for display at respective ones of the symbol positions of the current array, and evaluate the first game instance for any winning outcomes. In order to generate one or more further game instances, the processor retains any designated symbols at respective symbol positions that they occupied in a prior game instance, add a new row to the current array of symbol positions to form an updated current array, adds the designated symbol at any symbol position of the added row that neighbors a symbol position occupied by a designated symbol, selects symbols from the symbol data for display at respective ones of the symbol positions not occupied by a designated symbol, and evaluates the each further game instance for any winning outcomes.

In an embodiment, a method of operating a gaming device involves controlling a display to display a current array of symbol positions comprising a plurality of rows, generating a first game instance by selecting first symbols from the symbol data for display at respective ones of the symbol positions of the current array, and evaluating the first game instance for any winning outcomes. For further game instance, the method involves, for each game instance, retaining any designated symbols at respective symbol positions that they occupied in a prior game instance, adding a new row to the current array of symbol positions to form an updated current array, adding the designated symbol at any symbol position of the added row that neighbors a symbol position occupied by a designated symbol, and selecting symbols from the symbol data for display at respective ones of the symbol positions not occupied by a designated symbol, and evaluating the further game instance for any winning outcomes.

In an embodiment, a gaming system has a display, one or more processors, and at least one memory storing symbol data specifying a plurality of selectable symbols including a designated symbol, and instructions. When the instructions are executed by the one or more processors they cause the processor to control the display to display a current array of symbol positions comprising a plurality of rows, generate a first game instance by selecting first symbols from the symbol data for display at respective ones of the symbol positions of the current array, and evaluate the first game instance for any winning outcomes. In order to generate one or more further game instances the processor retains any designated symbols at respective symbol positions that they occupied in a prior game instance, add a new row to the current array of symbol positions to form an updated current array, adds the designated symbol at any symbol position of the added row that neighbors a symbol position occupied by a designated symbol, selects symbols from the symbol data for display at respective ones of the symbol positions not occupied by a designated symbol, and evaluates the each further game instance for any winning outcomes.

BRIEF DESCRIPTION OF THE DRAWINGS

FIG. 6 illustrates an example of a set of reel strips.

DETAILED DESCRIPTION

Figure 1:
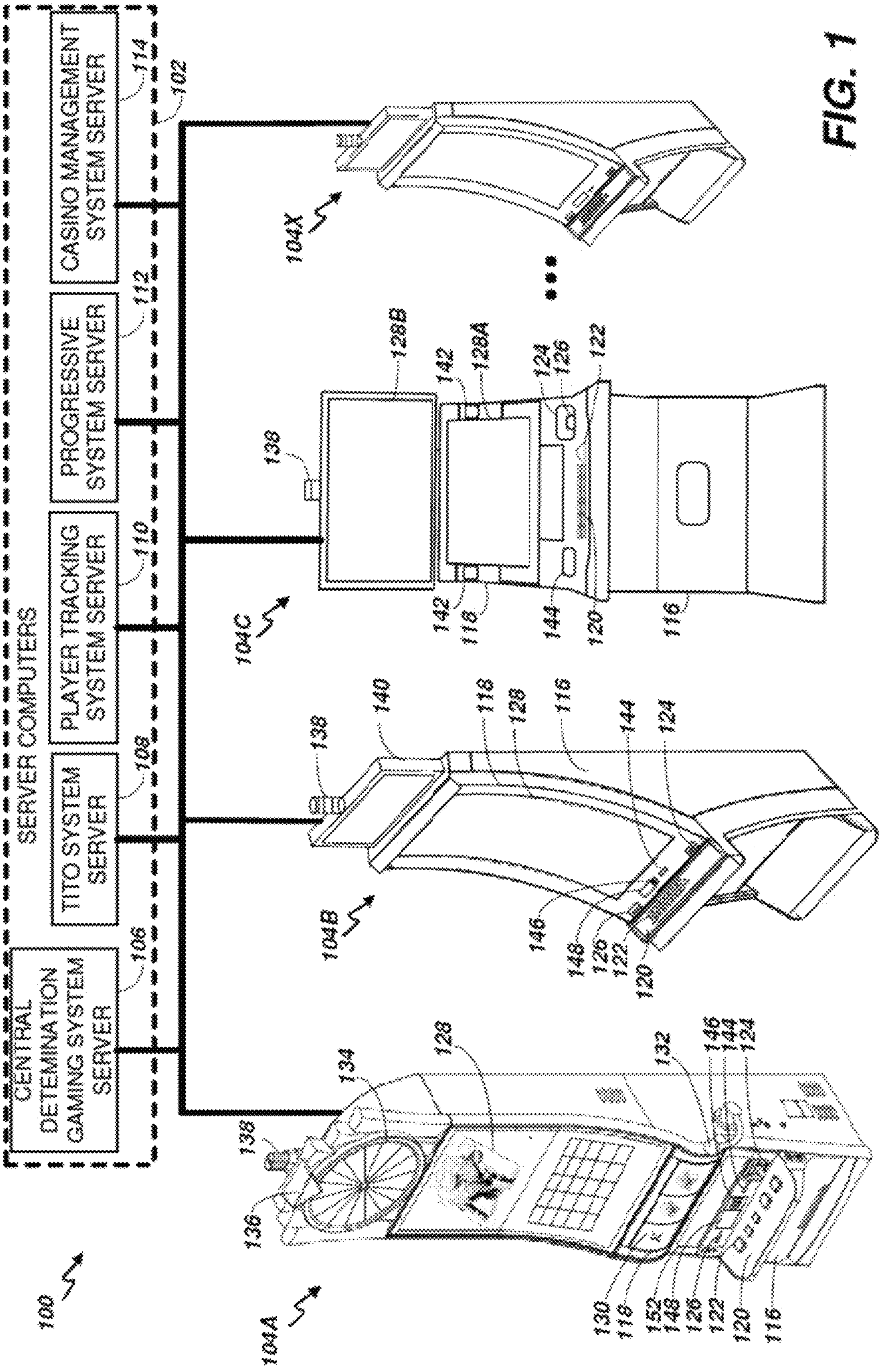
FIG. 1 is an exemplary diagram showing several EGMs networked with various gaming related servers.

FIG. 1 illustrates several different models of EGMs which may be networked to various gaming related servers. The present invention can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present invention may, in one or more embodiments, be practiced on a stand-alone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 116 which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Reim XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game. The gaming display area 118 may be variable in size to accommodate a varying number of symbol positions (such as rows and/or columns) for display. For example, the boundaries of the gaming display area 118 may be defined by one or more mechanical shutters controllable by a processor. The mechanical shutters may be controlled to open and close, to correspondingly reveal and conceal more or fewer symbol positions from the mechanical reels 130. For example, a top boundary of the gaming display area 118 may be raised by moving a corresponding mechanical shutter upwards to reveal an additional row of symbol positions on stopped mechanical reels. Further, a transparent or translucent display panel may be overlaid on the gaming display area 118 and controlled to electronically display one or more overlay symbols (such as a wild symbol) to override corresponding background symbols displayed on the mechanical reel(s).

In many configurations, the gaming device 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. In some embodiments a ticket reader can be used which is only capable of reading tickets. In some embodiments, a different form of token can be used to store a cash value, such as a magnetic stripe card.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking server system 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
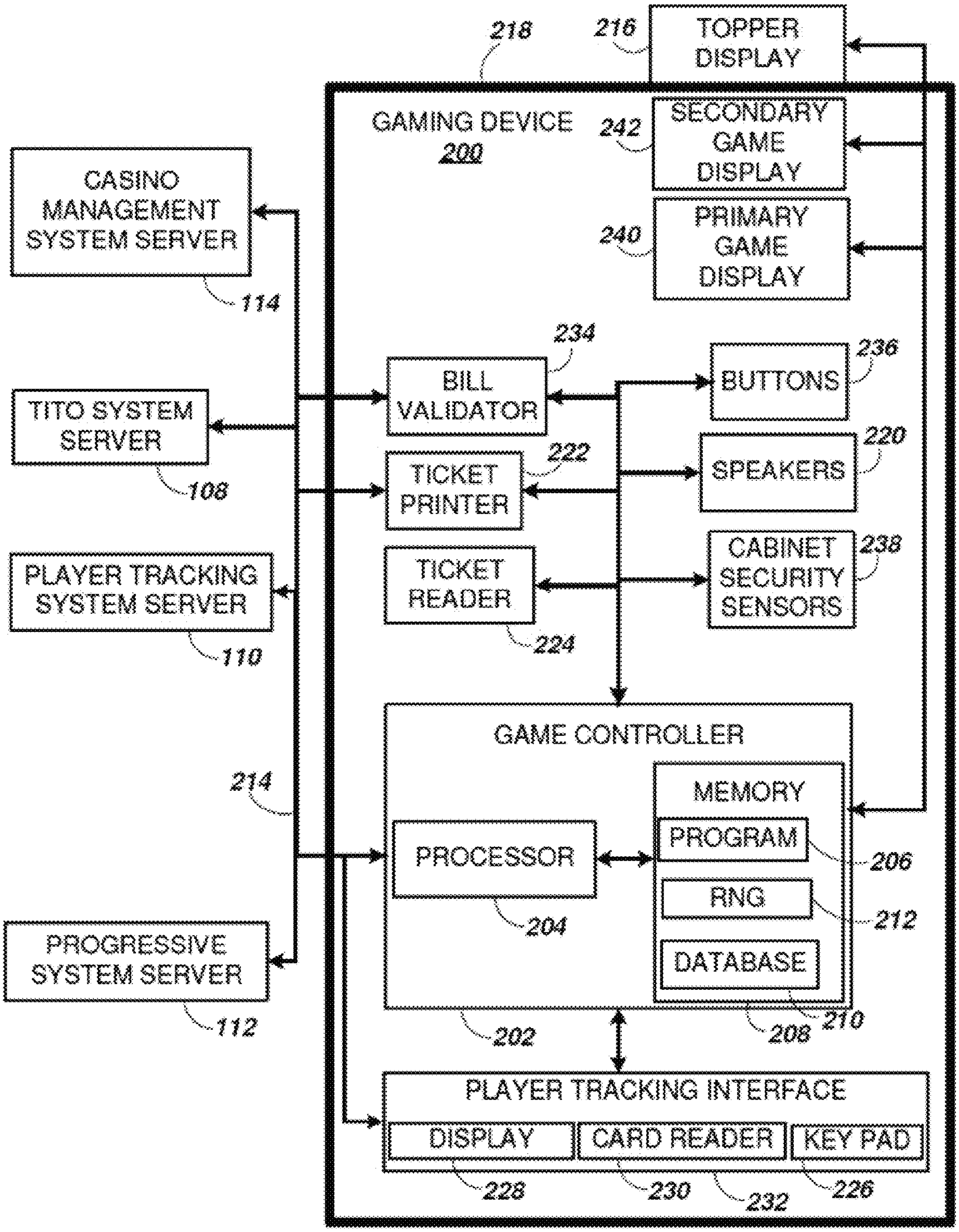
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present invention necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 118 which opens to provide access to the interior of the gaming device 104B. The main or service door 118 is typically used by service personnel to refill the ticket-out printer 126 and collect bills and tickets inserted into the bill validator 124. The door 118 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The game or games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance. In some embodiments, the random number generator 212 is a pseudo-random number generator.

Alternatively, a game instance (i.e., a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher (or another form of readable token) through an appropriate input device such as coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on the game displays 240, 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other input device which enables a player to input information into the gaming device 200. In some embodiments, a player's selection may apply across a plurality of game instances. For example, if the player is awarded additional game instances in the form of free games, the player's prior selection of the amount bet per line and the number of lines played may apply to the free games. The selections available to a player will vary depending on the embodiment. For example, in some embodiments a number of pay lines may be fixed. In other embodiments, the available selections may include different numbers of ways to win instead of different numbers of pay lines.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance using an output device that can output at least one of physical currency and a token representing currency (typically by pressing a cash out button to receive a ticket from the ticket printer 222). The ticket may be "cashed-in" for money or inserted into another machine to establish a credit balance for play.

Figure 3:
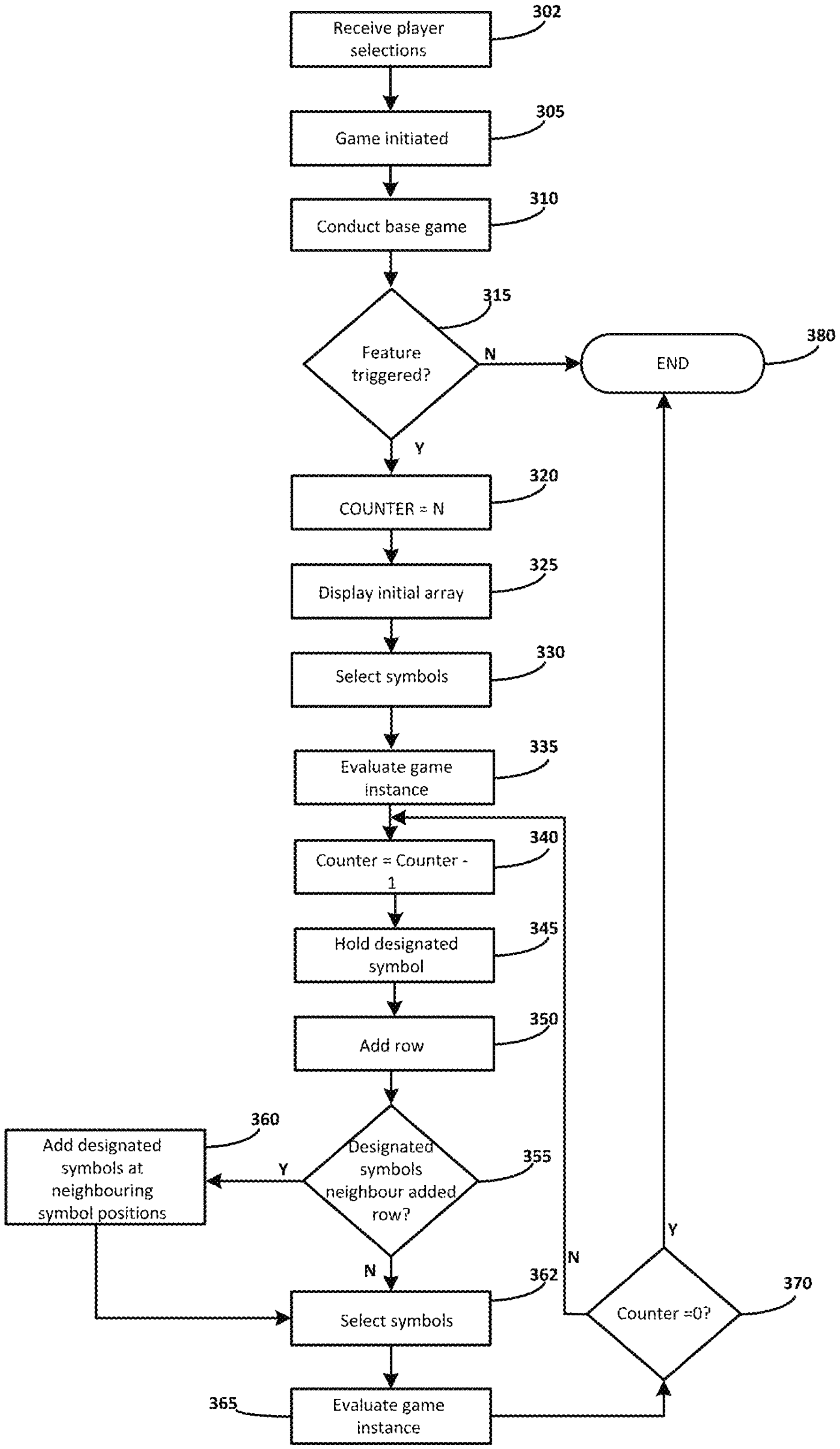
FIG. 3 is a flow chart illustrating the steps of a gaming method implemented by software executed by processor.

FIG. 3 is a flow chart illustrating the steps of a gaming method 300 implemented by software 206 executed by processor 206. The gaming method 300 is also able of being implemented across multiple components of the above described gaming system 100.

At step 302, the gaming device 200 receives player selections in relation to the play of a game. In an embodiment, the gaming device 200 offers selections of different numbers of ways to win and different amounts to wager on the selected number of ways to win. In another embodiment, the number of ways to win are fixed and the player can only select the amount they wager. In one example of a ways to win game, the different options selectable by a player are derived by allowing each displayed symbol of certain reels to be used to form symbol combinations with a symbol displayed at a designated, symbol positions of the other reels. For example, if three symbol of each of five reels strips are displayed in an array of three rows and five columns of symbol positions, the symbols displayed in the middle row are used for non-selected reels. In this configuration, one option the player can select may be three ways to win, formed by all symbol positions of the first column (i.e., top, middle and bottom) and the middle symbol position of all the other columns. Another option may be nine ways to win, formed by all symbol positions of the first and second columns and the middle symbol position of all the other columns. Another option may be 243 ways to won, formed by all symbol positions of all columns.

At step 305, the gaming device 200 receives an instruction to initiate a play of the game based on the player selections. For example, when a player presses a "play" button of buttons 236.

At step 310, the processor 204 executes program code 206 to conduct a base game instance, in an embodiment, by selecting symbols from symbol data stored in memory 208 for display on the primary display 240, evaluating the selected symbol against a pay table stored in memory 208 to determine whether the selected symbols include any winning combinations and making any prize awards due for winning combinations by adding them to a win meter. In an embodiment, the symbol data defines a plurality of reel strips, one corresponding to each column in the array.

At step 315, the processor 204 determines whether a trigger condition is met in respect of the base game in order to determine whether a feature game is to be provided. In one example, by determining whether the selected symbols include a defined number of scatter symbols.

If a feature game is not triggered at step 315, the game ends 380 and the player may cash out or may initiate a further play of the game.

In the embodiment, the feature game comprises a plurality of additional game instances, where the first game instance is conducted using the same number of rows and columns to the base game and in each additional game instance a row is added so that the array of symbol positions grows. In a similar embodiment, multiple rows of symbol positions are added in each additional game instance.

In order to implement the feature game, at step 320, the processor 204 sets a counter in memory 208 to an initial value (N) that controls the number of games instances that are conducted. In some embodiments, the initial value of the counter may depend on the number of scatter symbols in the trigger. For example, there may be different values for each of 3, 4, and 5 scatter symbols. In another example, the value of the counter is fixed. In one example, the array grows until there are 12 rows. The maximum number of rows may correspond to the screen orientation. For example, a landscape screen orientation may comfortably accommodate initially 3 rows and a maximum of 5 rows of symbols. In comparison, a portrait screen orientation may comfortably accommodate initially 3 rows and a maximum of 12 rows of symbols.

At step 325, the processor 204 controls the primary display 240 to display an initial array. In one example, the processor 204 maintains display of an array corresponding to that of the base game. In another, example display of the array is altered so that the player can perceive that a series of game instances is about to be conducted. In an example, the initial array has three rows and five columns. In an example, the player's selection of a number of ways to win in the base game is used to derive the evaluation that applies in the feature game. In an example, the number of ways to win in the base game is applied to the first game instance of the series of N game instances and is then modified as the array grows as described in further detail below.

At step 330, the processor 204 generates a first game instance of the series of game instances by selecting symbols for display in the initial array on the primary display 240. For example, by employing RNG 212 to select stopping positions for each of plurality of reel strips stored as symbol data in memory 210 as described in relation to FIGS. 6 & 7 below. In some embodiments the reels strips may be the same as the reel strips used in the base game. In some embodiments, the reel strips may be different to the reel strips used in the base game. Irrespective of whether the reel strips are the same or different as the base game, at least some of the reel strips have designated symbols, in this example wild symbols, which will be held in place for subsequent game instances of the series of game instances if selected. That is, each designated symbol will be displayed at the symbol position where it is selected in a game instance for each subsequent game instance of the series of game instances.

FIG. 6 illustrates an example of a set 600 of five reel strips 621, 622, 623, 624, 625 suitable for use in the feature game. In the example, each reel strip has fifteen reel strip positions 601-615. Each reel strip position of each reel has a symbol For example, a "Wild" symbol 631 occupies the sixth reel strip position 606 of the fourth reel 624. Other reels strips to those illustrated in FIG. 6 can be used, for example, reel strips where two or more wild symbols are placed at consecutive reel strip positions of a reel strip. In other examples, the feature game reel strips are, but could have between 30 and 100 reel strip positions. The actual length of the feature game reel strips would depend on factors such as the number of wild symbols (in general, the more wilds there are, the longer the reel strip needs to be to maintain the target RTP), and volatility (in general, the higher the prize value is, the longer the reel strip needs to be to lower the hit rate to maintain the target RTP).

Figure 7:
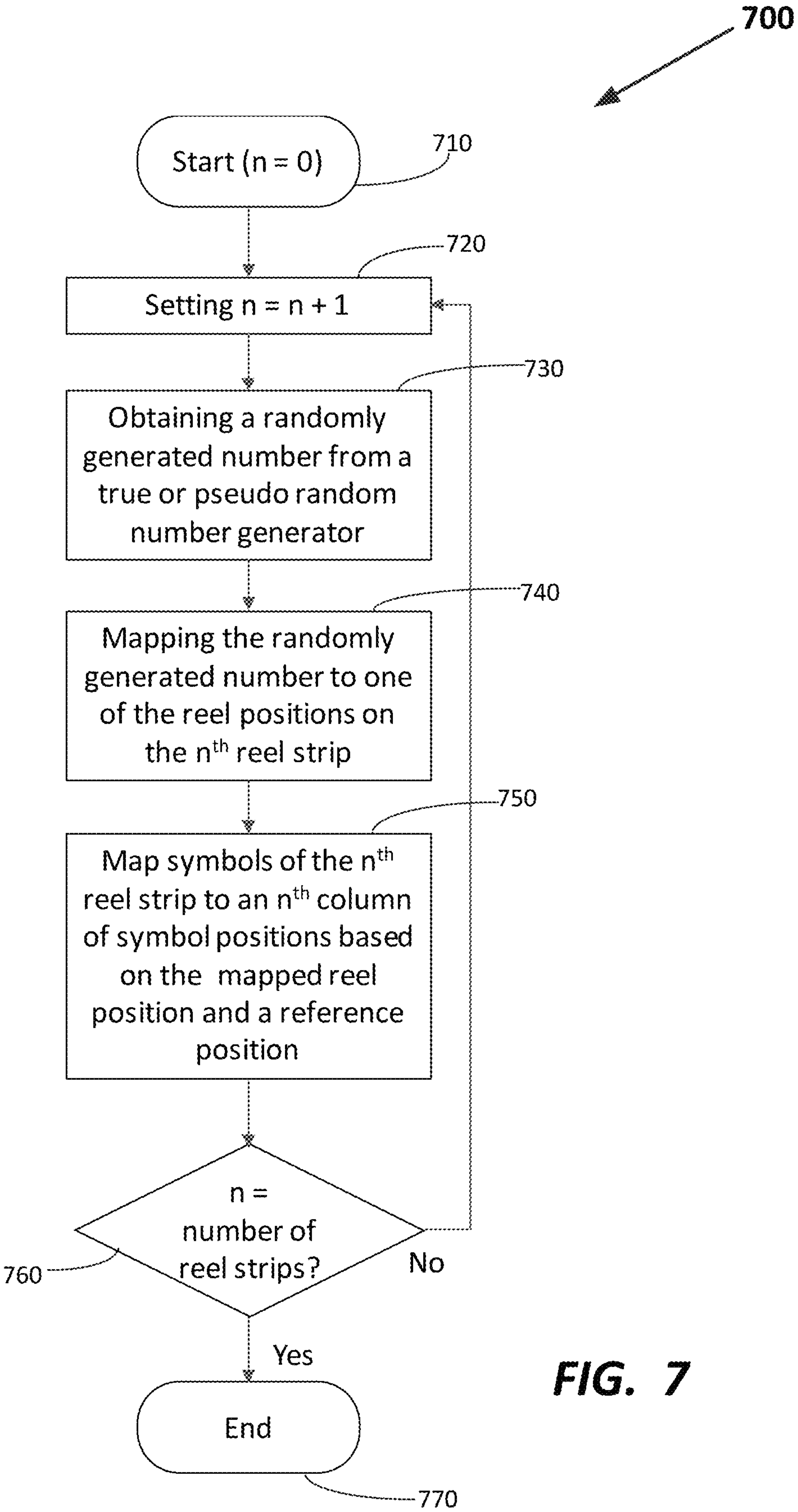
FIG. 7 is a flow chart of a method of selecting symbols from reel strips.

FIG. 7 is a flow chart of a method 700 carried out by the processor 204 to select symbols from reel strips. At step 710, the processor 204 starts the process of selecting symbols with a counter (n) set at zero as symbols have not yet been selected from any reel strips. At step 720, the processor 204 increments the counter. In the first iteration, the counter is set to 1 to reflect that symbols are to be selected from a first reel strip. At step 730 the processor obtains a randomly generated number from a true or pseudo random number generator 212. At step 740 the processor maps the generated number to one of the reel positions of the nth reel strip. In the first iteration, this is the first reel strip. To map the generated number to one of the reel positions, the possible values that can be returned from the RNG 212 are divided into ranges and associated with specific ones of the reel positions in memory 208. In one example, these ranges are stored as a look-up table. In one example, the ranges are each the same size so that each of the reel strip positions has the same chance of been selected. In other examples, the ranges may be arranged to weight the relative chances of selecting specific reel strip positions. The reel strips may be of different lengths.

At step 750, the processor 204 maps symbols of the nth reel strip to and nth column of symbol display positions based on the mapped reel position and a reference position. In an example, the reference position is the bottom position of the symbol positions of each column of symbol positions. In this example, the selected reel position (and hence the symbol at this position) is mapped to the bottom symbol position of the column. In an example, there are two other symbol positions in the column of symbol positions and hence symbols at two neighboring reel strip positions are also mapped to the symbol positions. Referring to the example reel strips of FIG. 6, if the value returned by the RNG 212 is mapped to reel position 613, then for the first reel strip 621, "Pic3" symbol 643 is mapped to a bottom symbol position, "10" symbol 642 is mapped to a middle symbol position, and "J" symbol is mapped to a top symbol position.

At step 760, the processor 760 determines whether symbols have been selected for all of the reel strips, and if not the processor reverts to step 720 and iterates through steps 730, 740 and 750 until it is determined at step 760 that symbols have been selected from all n reel strips and mapped to all n columns of symbol positions after which the symbol selection process ends 770. As described in more detail below, different numbers of symbols may be mapped to different numbers of symbol positions.

After the symbols of all reels have been mapped to symbol position, the processor 204 controls display 240 to display them at the symbol positions as part of step 330.

At step 335, the processor 204 evaluates the selected symbols based on a pay table stored in memory 208 to determine whether the selected symbols include any winning combinations. The processor 204 makes any prize awards due for winning combinations by adding them to the win meter. The pay table used for the feature game may be the same or different to the pay table used for the base game.

At step 340, the processor 204 keeps track of the number of game instances still to be conducted by decrementing the counter by one.

At step 345, the processor 204 begins the generation of a further game instance by retaining any designated symbols selected in the prior game instance. For example, the processor 204 updates memory 208 to indicate that a wild symbol is located at a specific symbol position in the initial array. In some embodiments, this step can be performed immediately after symbols are selected in the prior game instance.

At step 350, the processor 204 adds a row to the current array to form an updated current array. As this is the first time a row is added, the current array will be the initial or first array of the series of game instances and the updated array will be the second array.

Figure 4:
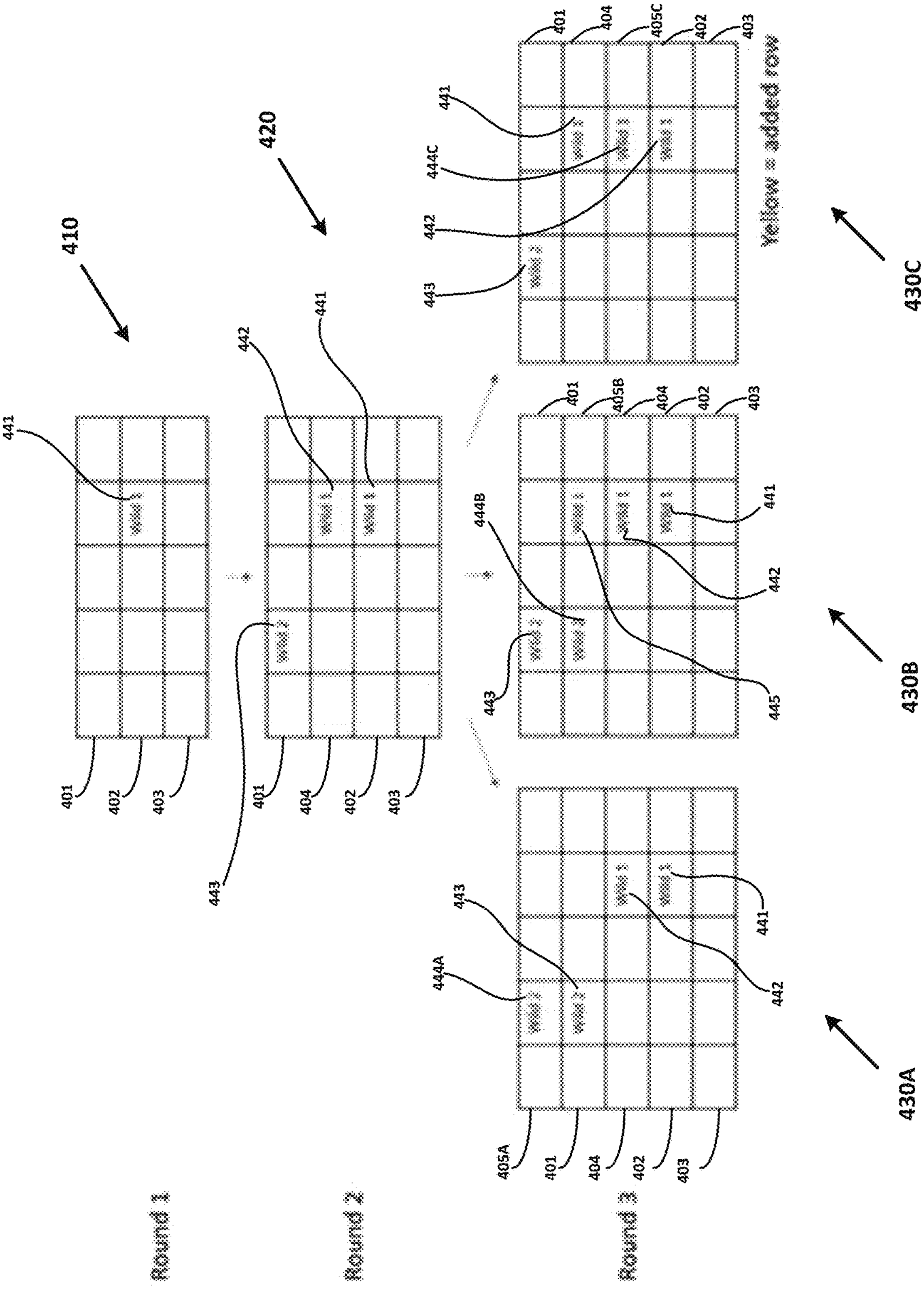
FIG. 4 is a schematic diagram showing examples of adding rows to the array of symbol positions for which symbols are evaluated in accordance with an embodiment.

Depending on the embodiment, the row may be added in a number of different ways, examples of which are illustrated in FIG. 4. In each of the arrays shown in FIG. 4, the shaded row is the added row. In an example, a new top row is added in each further game instance. This example is depicted by the transition between second round array 420 and a first example of a third round array 430A in FIG. 4, where row 405A is added to the top of the second array 420 which has rows 401, 402, 403 and 404 to form third round array 430A. In this example, row 405A may be added to the second round array 420 of 4×5 symbol positions, by raising the array's top boundary to form the expanded third round array 430A of 5×5 symbol positions. Such an expansion may be suited to gaming devices with mechanical reels or to video slots. Another example is to insert the new row in between current rows. Two examples of such an addition are shown by the transition from second round array 420 to third round arrays 430B, 430C. In the second example third round array 430B, the added row is row 405B. In the third example third round array 430C, the added row is row 405C. These other examples may be suited to video slots, where inserted rows of symbol positions are simulated on a video display. Another example of adding a row is to randomly select a position at which to add a row, for example, there are five positions at which a row could be added to second round array 420, and the processor may employ random number generator 212 to randomly select one of them.

At step 355, the processor 204 determines whether one or more designated symbols were retained at a position that neighbors a symbol position in the added row.

When one or more designated symbol neighbor an added row, at step 360, the processor 204 adds a designated symbol at the neighboring symbol position. In the case of video slots, the designated symbol addition may be achieved by way of controlling the display 240. For example, the display 240 may be controlled to persistently display, during the feature game, the designated symbol once added at the neighboring symbol position. Where the gaming device includes mechanical reels, the addition may include controlling, by the processor 204, a transparent or translucent display panel overlaying the mechanical reels to electronically and persistently display, during the feature game, the designated symbol once added near the neighboring symbol position. The overlaid designated symbol may override, for the purposes at steps 362 and 365, the background symbol on the mechanical reel at that position. Referring back to steps 350, 355 and 360, the new row of symbol positions may be added at the start of each further game instance, for example, after the previous round is complete but before the next round is initiated. In an alternative example described below, the processor 204 may be configured to seek to add the row so that it will neighbor a designated symbol.

For example, the processor 204 can be configured so that positioning of the row is deterministic or optimal. In this example, the actual placement is based on where existing wilds are. For example, from second round array 420, placing the additional row 405B in between rows 401 and 404, as shown in second example third round array 430B, duplicates the most wilds (i.e. with 2 duplicated wilds 445,444B) than all other placements (i.e. with 1 duplicated wild), and hence is picked by the processor 204. More duplication generally increases the winning or the chance of winning. If there are equal choices, then an actual placement creating the most clustered group of wilds (as opposed to a more dispersed group of wilds) is picked by the processor. A closer group of wilds generally increases the winning or the chance of winning.

In another example, the processor 204 is configured so that positioning of the row is partially deterministic and partially random. First the processor makes a deterministic determination so as to determine a list of placements that would each duplicate a wild. For example, starting from Round 2 array 420 any placement except at the bottom (i.e., 4 out of the 5) will duplicate at least 1 wild at the start of Round 3. Within these 4 potential placements, a random determination is made by processor 204 to determine the pick.

In an example, instead of displaying an originally selected wild symbol duplicating into multiple wild symbols, the addition of each designated symbol is displayed by "stretching" the originally selected wild symbol so that it occupies both the original and the neighboring symbol position. In a further example, the addition may be displayed as initially stretching and subsequently duplicating the originally selected wild symbol.

At step 362 further symbols are selected while retaining the wild symbols. In one example, this is achieved by the processor 240 randomly selecting stopping positions for each of the reel strips and mapping symbols of the reel strips to the current number of symbol positions in each column using the process described in relation to FIG. 7 above while overriding the selection at the symbol position or positions where a wild is held so that each symbol position continues to display the wild symbol. This process can result in the selection of further wild symbols. In some embodiments, where multiple rows are added for each further game instance, steps 355 and 360 are iterated multiple times before reaching step 362.

At step 365, the symbols of the further game instance (at this stage, the second game instance) are evaluated by the processor 204 for any winning outcomes in the pay table. As a row has been added, the symbol positions that need to be evaluated have changed. Thus, the processor 204 is configured to alter the evaluation that is applied.

Figure 5:
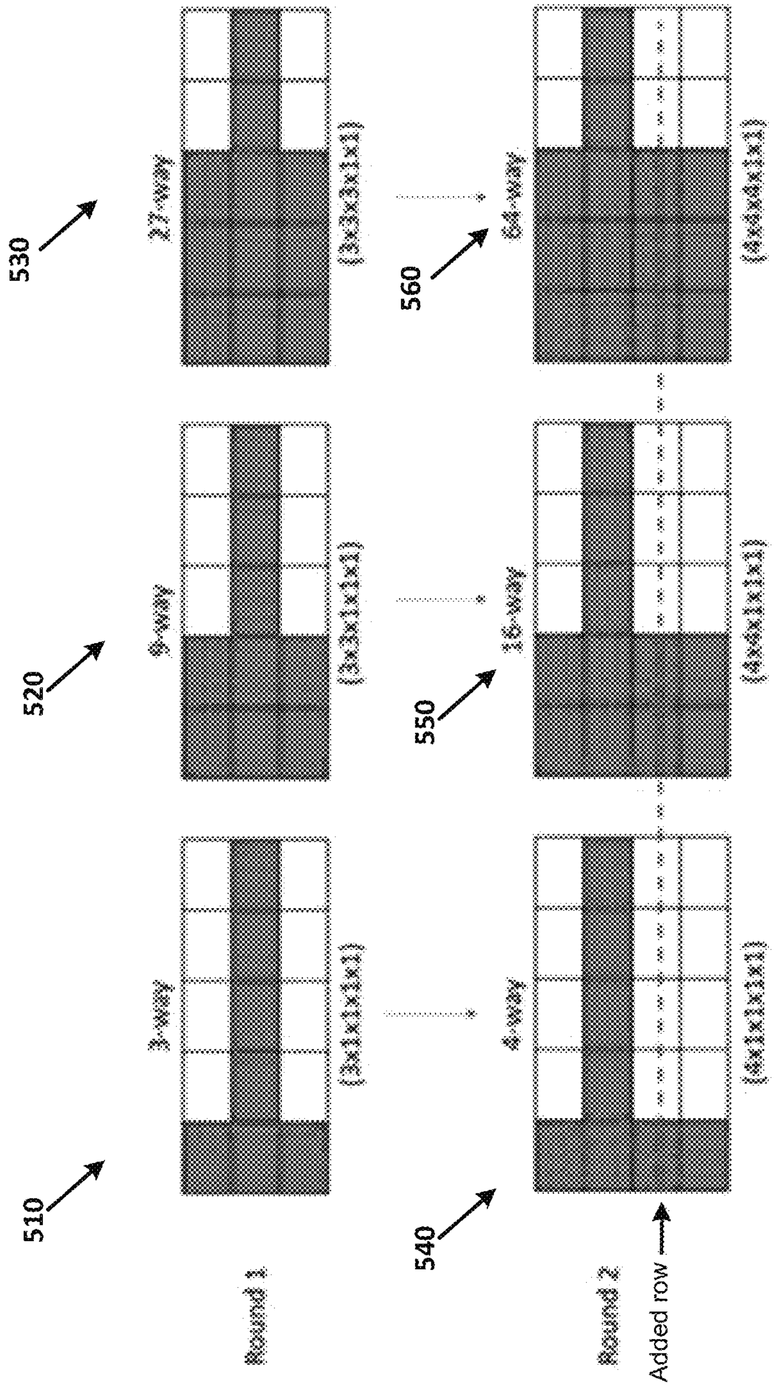
FIG. 5 is a schematic diagram showing examples of how evaluations change as rows are added in accordance with an embodiment.

FIG. 5 illustrates one example of how the evaluation can be altered by the processor 204 to accommodate the change to the array due to addition of a row while taking into account the player's initial selections. In these examples, the number of ways and hence the chance to win increases as more rows of symbol positions are added to the array.

Evaluation maps 510, 520, 530 illustrate different examples of selections of ways to win that apply in a first game instance of a series of game outcome which are then modified to form evaluation maps 540, 550 and 560 in the second game instance. In each of the evaluation maps, the symbol positions that are used in evaluating the selected symbols are shaded.

Evaluation map 510 shows that the player has selected three ways to win. The three ways to win are derived by combining each symbol position from the left most column with the shaded symbol from the other columns. That is, any of the three symbols selected for the first column can be combined with the symbols in the shaded positions in the other four columns. It will be apparent from map 510 that the player's selection of three ways to win corresponds to a selection of the left most column. Evaluation map 540 shows that the evaluation for the second game instance is derived from the player's selection of columns as the evaluation is formed by extending it to include the symbol position of the newly added row such that the player has four ways to win are derived by combining each symbol position from the left most column, with each shaded symbol from the other columns—i.e. $4\times1\times1\times1\times1=4$.

Evaluation map 520 shows an example where the player has selected nine ways to win (or two columns of symbol positions). The nine ways to win are derived by combining each symbol position from the left most column and second to left columns with the shaded symbol from the other columns. This evaluation is modified in the second game instance by incorporating the added symbol positions from the added row for both the left most column and second to left columns with the shaded symbol from the other columns as shown in evaluation map 550. As a result, there are 16 ways to win in the second game instance—i.e. $4\times4\times1\times1\times1=16$.

Evaluation map 530 shows an example where the player has selected 27 ways to win (or three columns of symbol positions). The 27 ways to win are derived by combining each symbol position from the three left most columns with the shaded symbol from the other columns. This evaluation is modified in the second game instance by incorporating the added symbol positions from the added row for each of the three leftmost columns with the shaded symbol from the other columns as shown in evaluation map 560. As a result, there are 64 ways to win in the second game instance—i.e. $4\times4\times4\times1\times1=64$.

It will be apparent from the above that the initial number of ways to win selected by the player also impacts the rate at which the modified evaluation grows.

The row used for unselected columns can be chosen in a number of ways. For example, it can be fixed, be the added row, or be selected at random.

As described above, in another example, the maximum number of ways to win may always be evaluated, e.g. 243 ways to win in the first round, 1024 ways to win in the second round, etc.

The processor 204 evaluates the selected symbols of the second game round based on the pay table stored in memory 208 to determine based on the relevant modified evaluation whether the selected symbols include any winning combinations. The processor 204 makes any prize awards due for winning combinations by adding them to the win meter.

At step 370 the processor determines whether the counter has reached zero (i.e. whether all the game instance of the feature game have been completed) and returns to step 340 if they have not in order to conduct a further game instance by repeating steps 345 to 365.

Once the counter reaches zero, the game ends 380. In some embodiments when the game ends the processor 204 transfers all wins to a credit meter in memory 208. In some embodiments, the processor may wait a defined time period before transferring credits from the win meter to the credit meter or transfer the credits when the player initiates another play of the game.

From the above, it will be apparent that FIG. 4 illustrates a number of examples of adding a row and duplication of wild symbols as well as the selection of further wild symbols.

In the transition between first round array 410 and second round array 420 a fourth row 404 is added to the initial, first 401, second 402 and third 403 rows. In the first round, a designated symbol in the form of first wild symbol 441 is selected in the second row of array 410. When row 404 is added, second wild symbol 442 is added whereas third wild symbol 443 derives from a further selection of the symbols.

In the transition between second round array 420 and the first example third round array 430A, a fifth row 405A is added which results in the addition of fourth wild symbol 444A which is added at the newly added symbol position that neighbors third wild symbol 443.

In the transition between second round array 420 and the second example third round array 430*b*, a fifth row 405B is added which results in the addition of fourth wild symbol 444B and fifth wild symbol 445 which are added at the newly added symbol positions that neighbor second wild symbol 443 and third wild symbol 442 respectively.

In the transition between second round array 420 and the third example third round array 430C, a fifth row 405C is added which results in the addition of fourth wild symbol 444C which is added at the newly added symbol position that neighbors both first wild symbol 441 and second wild symbol 442.

Figure 8:
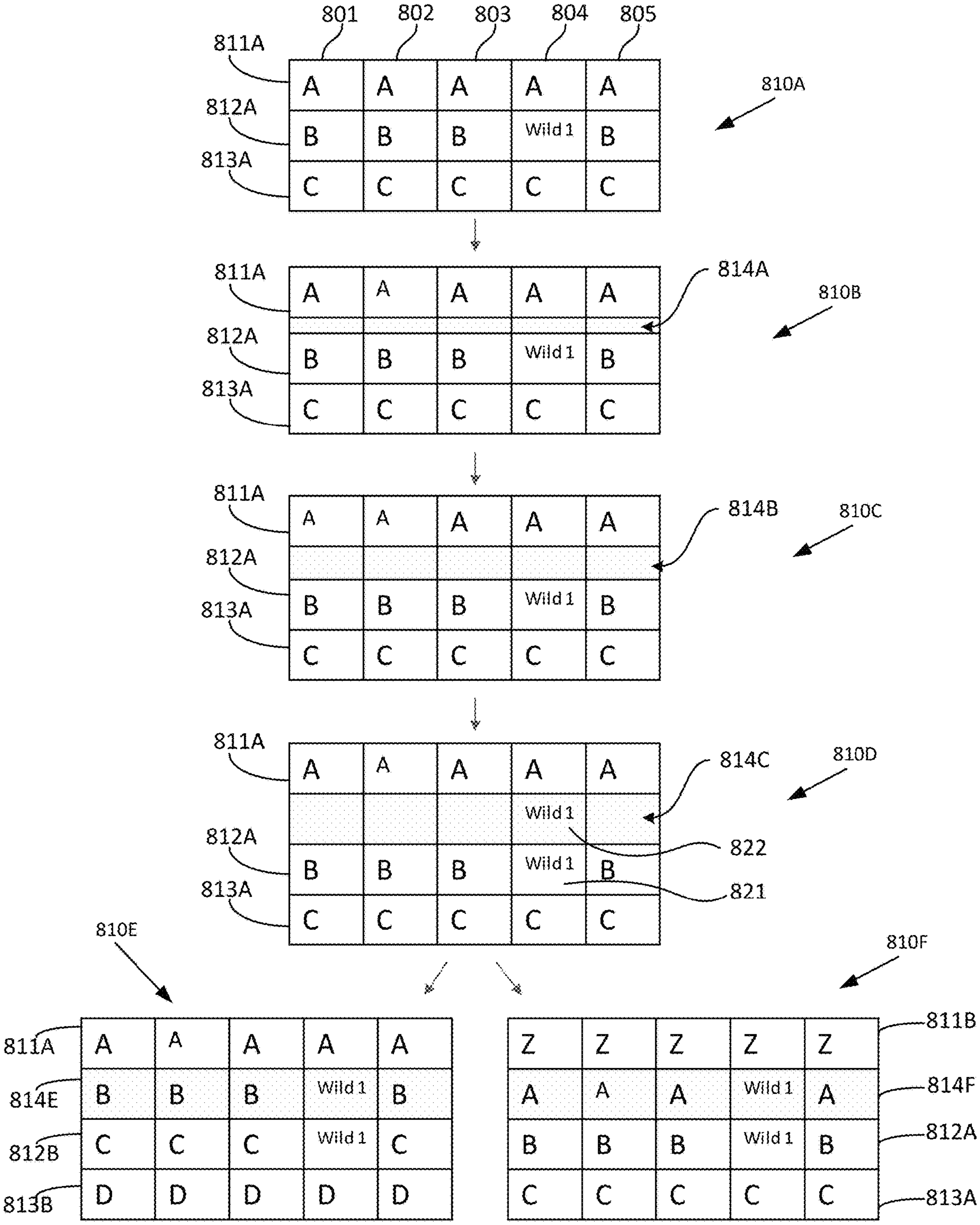
FIG. 8 is a schematic diagram showing examples of inserting rows.

Referring to FIG. 8, there is shown two examples of a row being added to an initial array 810A to form a final array 810E or alternative final array 810F under control of the processor 204. While the transition from the initial to final array is shown schematically as a number of stages, the skilled person will appreciate that the transitions can be animated to make the transition appear smoother.

The initial array 810A has five columns 801-805 and top 811A, middle 812A, and bottom rows 813A. A designated symbol in the form of "Wild1" symbol has been selected in the middle row 812A and fourth column 804.

First transitional array 810B shows that a partial additional row 814A has been added between rows 811A and 812A and at this stage is about a quarter of the size of the other rows as it begins to expand outward. At least one other row, e.g. top row 811A moves to accommodate Second transitional array 810C shows there is a larger partial additional row 814B which has now grown to about half the size of the other rows.

Third transitional array 810D shows a completed additional and partially populated row 814C which has been partially populated by adding second designated symbol 822 at a position that neighbors the first designated symbol 821.

In an embodiment, where the designated symbol is shown as being stretched, the stretching process could be shown in arrays 810B, 810C.

Final array 810E, shows a completely populated additional row 814E, where the remaining symbol positions have been populated by rotating the reel strips upward to fill the empty symbol positions. That is the "B" symbols of row 812A have moved into row 814E, the "C" symbols of row 813A have moved into row 812B and row 813B is populated by "D" symbols which were previously not displayed but which are next in the sequence of symbol positions specified by the reel strips. In this respect, it will be appreciated that in FIG. 8, the symbols are used to indicate the sequential nature of the reel strips rather than the actual symbols carried by the reel strips.

Alternative final array 810E, shows a completely populated additional row 814F, where the remaining symbol positions have been populated by rotating the reel strips downward to fill the empty symbol positions. That is the "A" symbols of row 81AA have moved into row 814F and row 811B is populated by "Z" symbols which were previously not displayed but which are next in the sequence of symbol positions specified by the reel strips.

An example embodiment in accordance with the above description comprises a gaming device comprising:

a display;

a processor; and a memory storing a) symbol data specifying a plurality of selectable symbols including a designated symbol, and b) instructions which when executed by the processor, cause the processor to:

a) control the display to display a current array of symbol positions comprising a plurality of rows;

b) generate a first game instance by selecting first symbols from the symbol data for display at respective ones of the symbol positions of the current array;

c) evaluate the first game instance for any winning outcomes;

d) generate one or more further game instances by, for each game instance:

i) retaining any designated symbols at respective symbol positions that they occupied in a prior game instance, ii) adding a new row to the current array of symbol positions to form an updated current array, iii) adding the designated symbol at any symbol position of the added row that neighbors a symbol position occupied by a designated symbol;

iv) selecting symbols from the symbol data for display at respective ones of the symbol positions not occupied by a designated symbol; and e) evaluate the each further game instance for any winning outcomes.

In another example embodiment when the instructions are executed by the processor they cause the processor to add each new row as a new top row to form the updated current array.

In another example embodiment when the instructions are executed by the processor they cause the processor to add each new row as a new bottom row to form the updated current array.

In another example embodiment when the instructions are executed by the processor they cause the processor to add each new row between the top and bottom rows of the current array to form the updated current array.

In another example embodiment when the instructions are executed by the processor they cause the processor to randomly select positioning of the new row to form the updated current array.

In another example embodiment when the instructions are executed by the processor they cause the processor to select positioning of the new row to form the updated current array based on a position of at least one designated symbol within the current array.

In another example embodiment when the instructions are executed by the processor they cause the processor to select positioning of the new row to maximize addition of designated symbols to neighboring symbol positions of the added row.

In another example embodiment the current array used to generate the first game instance comprises a three row by five column array.

In another example embodiment the designated symbol is a wild symbol.

In another example embodiment when the instructions are executed by the processor they cause the processor to generate further game instances until an end condition is met.

In another example embodiment the end condition is that the processor has generated a defined number of game instances.

In another example embodiment when the instructions are executed by the processor they cause the processor to add any designated symbols by modifying display of a current designated symbol to occupy both a current symbol position and the relevant neighboring symbol position.

In another example embodiment the gaming device is configured to enable a player to establish a credit balance on the gaming device and to cash-out a credit balance.

In another example embodiment the gaming device comprises at least one input device adapted to receive at least one of physical currency and a token representing currency to establish the credit balance.

In another example embodiment the gaming device comprises at least one output device adapted to output at least one of physical currency and a token representing currency to cash-out the credit balance.

Another example embodiment provides a method of operating a gaming device comprising:

- a) controlling a display to display a current array of symbol positions comprising a plurality of rows;
- b) generating a first game instance by selecting first symbols from the symbol data for display at respective ones of the symbol positions of the current array;
- c) evaluating the first game instance for any winning outcomes;
- d) generating one or more further game instances by, for each game instance:
  - i) retaining any designated symbols at respective symbol positions that they occupied in a prior game instance,
  - ii) adding a new row to the current array of symbol positions to form an updated current array,
  - iii) adding the designated symbol at any symbol position of the added row that neighbors a symbol position occupied by a designated symbol;
  - iv) selecting symbols from the symbol data for display at respective ones of the symbol positions not occupied by a designated symbol; and
- e) evaluating the each further game instance for any winning outcomes.

In another example embodiment the method comprises adding each new row as a new top row to form the updated current array.

In another example embodiment the method comprises adding each new row as a new bottom row to form the updated current array.

In another example embodiment the method comprises adding each new row between the top and bottom rows of the current array to form the updated current array.

In another example embodiment the method comprises randomly selecting positioning of the new row to form the updated current array.

In another example embodiment the method comprises randomly selecting positioning of the new row to form the updated current array based on a position of at least one designated symbol within the current array.

In another example embodiment the method comprises selecting positioning of the new row to maximize addition of designated symbols to neighboring symbol positions of the added row.

In another example embodiment the current array used to generate the first game instance comprises a three row by five column array.

In another example embodiment the designated symbol is a wild symbol.

In another example embodiment the method comprises generating further game instances until an end condition is met.

In another example embodiment the end condition is that the processor has generated a defined number of game instances.

In another example embodiment the method comprises adding any designated symbols by modifying display of a current designated symbol to occupy both a current symbol position and the relevant neighboring symbol position.

Another example embodiment provides a system comprising:

a display;

one or more processors; and at least one memory storing a) symbol data specifying a plurality of selectable symbols including a designated symbol, and b) instructions which when executed by the one or more processors, cause the one or more processors to:

- a) control the display to display a current array of symbol positions comprising a plurality of rows;
- b) generate a first game instance by selecting first symbols from the symbol data for display at respective ones of the symbol positions of the current array;
- c) evaluate the first game instance for any winning outcomes;
- d) generate one or more further game instances by, for each game instance:
  - i) retaining any designated symbols at respective symbol positions that they occupied in a prior game instance,
  - ii) adding a new row to the current array of symbol positions to form an updated current array,
  - iii) adding the designated symbol at any symbol position of the added row that neighbors a symbol position occupied by a designated symbol;
  - iv) selecting symbols from the symbol data for display at respective ones of the symbol positions not occupied by a designated symbol; and
- e) evaluate the each further game instance for any winning outcomes.

Another example embodiment provides computer program code which when executed by a processor, causes the processor to carry out the above method. A computer readable storage medium comprising the program is also provided.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming device comprising:
at least one memory with instructions stored thereon; and
at least one processor in communication with the at least one memory, wherein the instructions, when executed by the at least one processor, cause the at least one processor to:
cause display of an array of symbol positions comprising first symbol positions populated with a first plurality of symbols, the first plurality of symbols including a first designated symbol at a symbol position of the first symbol positions;
identify a plurality of potential locations for second symbol positions to be added adjacent the symbol position;
determine a respective number of first designated symbols that would be duplicated for each of the plurality of potential locations;
determine a subset of the plurality of potential locations that would result in a maximum number of first designated symbols being duplicated, wherein the maximum number comprises a greatest respective number of first designated symbols of the respective numbers of first designated symbols;
select a location for the second symbol positions from the subset of the plurality of potential locations; and
cause display of the maximum number of first designated symbols at the second symbol positions by causing the maximum number of first designated symbols to be displayed on a display panel that overlays mechanical reels such that the maximum number of first designated symbols override any symbols displayed behind the maximum number of first designated symbols on the mechanical reels, the maximum number of first designated symbols being included in a second plurality of symbols at the location for the second symbol positions to create an updated array of symbol positions.

2. The electronic gaming device of claim 1, wherein the instructions further cause the at least one processor to cause display of the first designated symbol at a symbol position of the second symbol positions adjacent the symbol position, thereby duplicating the first designated symbol.

3. The electronic gaming device of claim 1, wherein the instructions further cause the at least one processor to cause display of each symbol position of the first symbol positions and the second symbol positions other than symbol positions where the first designated symbol is displayed being repopulated with symbols, such that the first designated symbol is persistently displayed at the symbol position of the first symbol positions and the symbol position of the second symbol positions.

4. The electronic gaming device of claim 1, wherein the instructions further cause the at least one processor to cause display of the second symbol positions as at least one of i) a new top row above a topmost row of the array of symbol positions, ii) a new bottom row below a bottommost row of the array of symbol positions, or iii) a new row between a topmost row and a bottommost row of the array of symbol positions.

5. The electronic gaming device of claim 1, wherein the instructions further cause the at least one processor to cause display of the second symbol positions as at least one of i) a new leftmost column to the left of a leftmost column of the array of symbol positions, ii) a new rightmost column to the right of a rightmost column of the array of symbol positions, or iii) a new column between the leftmost column and the rightmost column of the array of symbol positions.

6. The electronic gaming device of claim 1, wherein the instructions further cause the at least one processor to randomly select the location for the second symbol positions based on a random number generator (RNG) output.

7. The electronic gaming device of claim 1, wherein the instructions further cause the at least one processor to at least one of determine the plurality of potential locations or randomly select the location for the second symbol positions based on at least one message received from a server computer.

8. The electronic gaming device of claim 1, wherein the instructions further cause the at least one processor to:
determine an optimal location from the subset of the plurality of potential locations, wherein the optimal location is associated with a most clustered group of first designated symbols than other locations of the subset of the plurality of potential locations; and
select the optimal location as the location for the second symbol positions.

9. At least one non-transitory computer-readable storage medium with instructions stored thereon that, in response to execution by at least one processor, cause the at least one processor to:
cause display of an array of symbol positions comprising first symbol positions populated with a first plurality of symbols, the first plurality of symbols including a first designated symbol at a symbol position of the first symbol positions;
identify a plurality of potential locations for second symbol positions to be added adjacent the symbol position;
determine a respective number of first designated symbols that would be duplicated for each of the plurality of potential locations;
determine a subset of the plurality of potential locations that would result in a maximum number of first designated symbols being duplicated, wherein the maximum number comprises a greatest respective number of first designated symbols of the respective numbers of first designated symbols;
select a location for second symbol positions from the subset of the plurality of potential locations; and
cause display of the maximum number of first designated symbols at the second symbol positions by causing the maximum number of first designated symbols to be displayed on a display panel that overlays mechanical reels such that the maximum number of first designated symbols override any symbols displayed behind the maximum number of first designated symbols on the mechanical reels, the maximum number of first designated symbols being included in a second plurality of symbols at the location for the second symbol positions to create an updated array of symbol positions.

10. The at least one non-transitory computer-readable storage medium of claim 9, wherein the instructions further cause the at least one processor to cause display of the first designated symbol at a symbol position of the second symbol positions adjacent the symbol position, thereby duplicating the first designated symbol.

11. The at least one non-transitory computer-readable storage medium of claim 9, wherein the instructions further cause the at least one processor to cause display of each symbol position of the first symbol positions and the second symbol positions other than symbol positions where the first designated symbol is displayed being re-populated with symbols, such that the first designated symbol is persistently displayed at the symbol position of the first symbol positions and the symbol position of the second symbol positions.

12. The at least one non-transitory computer-readable storage medium of claim 9, wherein the instructions further cause the at least one processor to cause display of the second symbol positions as at least one of i) a new top row above a topmost row of the array of symbol positions, ii) a new bottom row below a bottommost row of the array of symbol positions, or iii) a new row between a topmost row and a bottommost row of the array of symbol positions.

13. The at least one non-transitory computer-readable storage medium of claim 9, wherein the instructions further cause the at least one processor to cause display of the second symbol positions as at least one of i) a new leftmost column to the left of a leftmost column of the array of symbol positions, ii) a new rightmost column to the right of a rightmost column of the array of symbol positions, or iii) a new column between the leftmost column and the rightmost column of the array of symbol positions.

14. The at least one non-transitory computer-readable storage medium of claim 9, wherein the instructions further cause the at least one processor to randomly select the location for the second symbol positions based on a random number generator (RNG) output.

15. The at least one non-transitory computer-readable storage medium of claim 9, wherein the instructions further cause the at least one processor to at least one of cause display of the array of symbol positions or cause display of the second symbol positions by transmitting at least one message to a gaming device, wherein receipt of the at least one message by the gaming device causes the gaming device to the at least one of cause display of the array of symbol positions or cause display of the second symbol positions.

16. A method of electronic gaming implemented by at least one processor in communication with at least one memory, the method comprising:

generating an array of symbol positions comprising first symbol positions populated with a first plurality of symbols, the first plurality of symbols including a first designated symbol at a symbol position of the first symbol positions;

identifying a plurality of potential locations for second symbol positions to be added adjacent the symbol position;

determining a respective number of first designated symbols that would be duplicated for each of the plurality of potential locations;

determining a subset of the plurality of potential locations that would result in a maximum number of first designated symbols being duplicated, wherein the maximum number comprises a greatest respective number of first designated symbols of the respective numbers of first designated symbols;

selecting a location for second symbol positions from the subset of the plurality of potential locations; and generating the maximum number of first designated symbols at the second symbol positions by causing the maximum number of first designated symbols to be displayed on a display panel that overlays mechanical reels such that the maximum number of first designated symbols override any symbols displayed behind the maximum number of first designated symbols on the mechanical reels, the maximum number of first designated symbols being included in a second plurality of symbols at the location for the second symbol positions to create an updated array of symbol positions.

17. The method of claim 16, further comprising transmitting a message to a gaming device, wherein receipt of the message by the gaming device causes the gaming device to cause display of the array of symbol positions on a display device of the gaming device.

18. The method of claim 16, further comprising transmitting a message to a gaming device, wherein receipt of the message by the gaming device causes the gaming device to cause display of the updated array of symbol positions on a display device of the gaming device.

19. The method of claim 16, further comprising randomly selecting the location for the second symbol positions based on a random number generator (RNG) output.

* * * * *